US011474987B1

United States Patent
Stein et al.

(10) Patent No.: US 11,474,987 B1
(45) Date of Patent: Oct. 18, 2022

(54) IMAGE ANALYSIS INTERFACE

(71) Applicant: Palantir Technologies Inc., Palo Alto, CA (US)

(72) Inventors: Michael Stein, Arlington, VA (US); Adam Campbell, Ithaca, NY (US); Alicia Monfre, New York, NY (US); Angela Muller, Los Gatos, CA (US); Enoch Hsiao, Washington, DC (US); Lucas Ray, San Francisco, CA (US); Matthew Brady, Washington, DC (US); Michelle Brown, New York, NY (US); Paul Lisker, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 143 days.

(21) Appl. No.: 16/267,856

(22) Filed: Feb. 5, 2019

Related U.S. Application Data

(60) Provisional application No. 62/767,936, filed on Nov. 15, 2018.

(51) Int. Cl.
*G06F 16/22* (2019.01)
*G06F 3/04845* (2022.01)
(Continued)

(52) U.S. Cl.
CPC ........ *G06F 16/2255* (2019.01); *G06F 3/0482* (2013.01); *G06F 3/04845* (2013.01); *G06F 16/2379* (2019.01); *G06F 16/252* (2019.01)

(58) Field of Classification Search
None
See application file for complete search history.

(56) References Cited

U.S. PATENT DOCUMENTS 6,980,984 B1  12/2005  Huffman et al.
7,657,540 B1   2/2010  Bayliss
(Continued)

FOREIGN PATENT DOCUMENTS

EP   3037992 A1   6/2016

OTHER PUBLICATIONS

DataHub. "CSV—Comma Separated Values". Dec. 5, 2017 snapshot via Archive.org. URL Link: <https://datahub.io/docs/data-packages/csv>. Accessed Nov. 2020. (Year: 2017).*

(Continued)

*Primary Examiner* — Irene Baker
(74) *Attorney, Agent, or Firm* — Schwegman Lundberg & Woessner, P.A.

(57) ABSTRACT

Example embodiments relate to a system to generate and cause display of a specially configured graphical user interface to receive and present collections of images. According to certain example embodiments, an image analysis system: receives an image file from a client device; generates a hash value based on the image file; performs a comparison of the hash value with a list that comprises a collection of hash values; identifies a match to the hash value among the collection of hash values; assigns a label to the image file in response to identifying the match among the collection of image files from the list; and indexes the image file at a memory location identified by the label assigned to the image file.

20 Claims, 11 Drawing Sheets

(51) Int. Cl.
  *G06F 16/25* (2019.01)
  *G06F 16/23* (2019.01)
  *G06F 3/0482* (2013.01)

(56) References Cited

U.S. PATENT DOCUMENTS

| | | | |
|---|---|---|---|
| 7,899,796 | B1 | 3/2011 | Borthwick et al. |
| 7,900,052 | B2 | 3/2011 | Jonas |
| 9,348,920 | B1 | 3/2016 | Kesin |
| 10,476,975 | B2 | 11/2019 | Bogomolov et al. |
| 2001/0041020 | A1* | 11/2001 | Shaffer ............. H04N 1/00193 382/305 |
| 2002/0083039 | A1 | 6/2002 | Ferrari et al. |
| 2005/0198076 | A1* | 9/2005 | Stata ..................... G06F 16/334 |
| 2006/0197963 | A1* | 9/2006 | Royal .................... G06T 11/60 358/1.2 |
| 2006/0251339 | A1* | 11/2006 | Gokturk .................. G06K 9/46 382/305 |
| 2007/0081744 | A1* | 4/2007 | Gokturk ............ G06K 9/00375 382/305 |
| 2007/0130206 | A1 | 6/2007 | Zhou et al. |
| 2008/0071731 | A1 | 3/2008 | Ma et al. |
| 2009/0024589 | A1 | 1/2009 | Sood et al. |
| 2010/0114887 | A1 | 5/2010 | Conway et al. |
| 2010/0153386 | A1* | 6/2010 | Tysowski .............. G06F 16/487 707/736 |
| 2011/0258190 | A1 | 10/2011 | Chen et al. |
| 2012/0159312 | A1 | 6/2012 | Mital et al. |
| 2012/0278273 | A1 | 11/2012 | Fang |
| 2013/0138660 | A1* | 5/2013 | Garbe .................... G06F 16/93 707/742 |
| 2013/0304770 | A1 | 11/2013 | Boero et al. |
| 2014/0086590 | A1 | 3/2014 | Ganick et al. |
| 2014/0330845 | A1 | 11/2014 | Feidschuh |
| 2014/0379755 | A1 | 12/2014 | Kuriakose et al. |
| 2015/0234885 | A1* | 8/2015 | Weinstein ............. G06F 16/152 707/690 |
| 2017/0142479 | A1* | 5/2017 | Babbar .................... G06F 16/71 |
| 2017/0344544 | A1* | 11/2017 | Shin ..................... G06F 16/5866 |
| 2018/0039626 | A1* | 2/2018 | Raichelgauz ........... G06F 16/14 |
| 2018/0144440 | A1 | 5/2018 | Andrew et al. |
| 2019/0347360 | A1* | 11/2019 | Bortnikov ............... G06F 16/22 |

OTHER PUBLICATIONS

"U.S. Appl. No. 14/807,658, First Action Interview Pre-Interview Communication dated Jul. 5, 2016", 4 pgs.

"U.S. Appl. No. 15/080,169, Appeal Decision dated Jul. 2, 2019", 15 pgs.

"U.S. Appl. No. 15/372,318, Response filed May 28, 19 to First Action Interview dated Feb. 28, 2019", 13 pgs.

"U.S. Appl. No. 15/372,318, Notice of Allowance dated Jul. 3, 2019", 15 pgs.

U.S. Appl. No. 15/372,318, filed Dec. 7, 2016, Building a User Profile Data Repository.

U.S. Appl. No. 15/080,169, filed Mar. 24, 2016, Computer-Implemented Systems and Methods for Analyzing Electronic Communications.

* cited by examiner

IMAGE ANALYSIS INTERFACE

TECHNICAL FIELD

The subject matter disclosed herein generally relates to systems to process and display images in a specially configured graphical user interface.

BACKGROUND

Individuals within organizations are often required to analyze vast collections of images. For example, certain organization may have a need to review a collection of images to identify features within the images. As a result, systems have been developed to facilitate browsing filtering and displaying collections of images. While these existing systems do provide useful interfaces for the purposes of browsing collections of images, a number of improvements can be made to further improve the efficiency of users in navigating and analyzing these collections of images.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
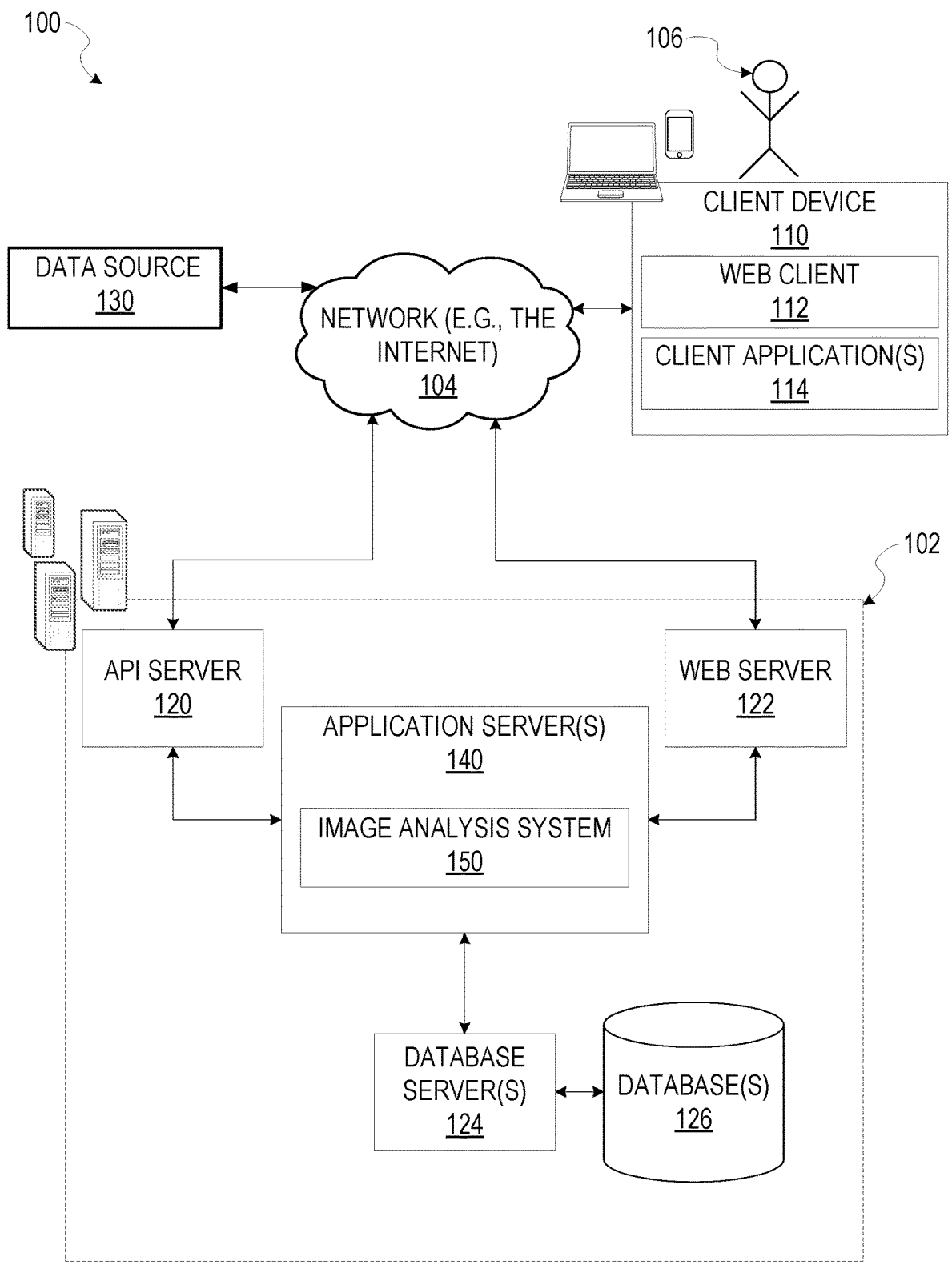
FIG. 1 is a network diagram depicting a networked environment suitable for operating an image analysis system, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a system to generate and cause display of a specially configured graphical user interface (GUI) to receive and present collections of images. According to certain example embodiments, an image analysis system: receives an image file from a client device; generates a hash value based on the image file; performs a comparison of the hash value with a list that comprises a collection of hash values; identifies a match to the hash value among the collection of hash values; assigns a label to the image file in response to identifying the match among the collection of image files from the list; and indexes the image file at a memory location identified by the label assigned to the image file.

The image analysis system further provides functionality to generate and cause display of an interface to facilitate the analysis of the collection of image files. A user of the image analysis system provides an input that identifies a collection of images. For example, the input may comprise an identification of a label, or an image attribute. Responsive to receiving the input, the image analysis system retrieves (or curates) the collection of images, and causes display of a presentation of the collection of images within a specially configured GUI.

In some embodiments, the presentation of the collection of images comprises a sortable display of images from among the collection of images. The display of each image includes a depiction of the image along with various attributes of the image, labels associated with the images, and metadata associated with the image.

Users may provide inputs, via the GUI, to filter the collection of images, or adjust attributes of the images presented among the collection of images. For example, a user may provide an input that defines one or more filter criteria, such as a label or image attribute. Image attributes may include an identifier associated with a device that captured the image, location metadata that identifies a location associated with the image, temporal data that identifies a time or date in which the image was captured. Responsive to receiving the input, the image analysis system filters the collection of images based on the filter criteria. Similarly, the input may additionally define a change to an image property, such as a colorization or a size. For example, a colorization may define colors presented in an image, or whether or not an image is depicted in black and white, gray scale, or with a full red-green-blue (RGB) color pallet. In such embodiments, responsive to receiving the input, the image analysis system alters the image property of the images among the collection of images identified by the filter criteria.

The image analysis system includes features to enable users to perform a bulk image export of an identified collection of images. In such embodiments, responsive to receiving a request to export a collection of images, the image analysis system generates a file folder (e.g., a ZIP file) that includes the collection of images, and also generates a comma-separated value (CSV) file that comprises hash values of each image from the collection of images, labels of the images from the collection of images, and a set of references. Each reference in the set of references identifies locations of corresponding images within the file folder.

Consider an illustrative example from a user perspective. A user uploads an image file to the image analysis system. Responsive to receiving the image file, the image analysis system generates a hash value based on the image file, and compares the hash value to one or more lists comprising hash values, wherein each list has its own associated label, or tag.

The image analysis system applies one or more hash functions to map the image file uploaded by the user to an index into a table, and to collect a list of the numbers/references of all records (e.g., image files) with the same hash value of the. Once the table is complete, the image analysis system assigns labels to all duplicate records. The duplicates can be identified by scanning the corresponding labels/tags, and comparing them.

Similarly, the image analysis system may identify image files that are "similar" but no necessarily identical to the image file uploaded by the user. For example, the image analysis system may employ a hash function that map s similar key s to hash values that differ by a small integer value. The image analysis system may build a table of all record numbers, using such a hash function, then similar records may receive matching labels/tags.

The image analysis system identifies a match to the hash value associated with the image file within at least one of the lists. The matching hash value from the list is associated with a corresponding image file that may be a duplicate to the image file uploaded by the user. The image analysis system may then retrieve any labels or tags associated with the list and the matching image file, and assign the labels and tags to the recently uploaded image file. Based on the assigned labels and tags, the image analysis system indexes the image file at a memory location that may be referenced at a later time based on the labels and tags.

Later, the user provides an input into the image analysis system that includes an identification of the label. Responsive to receiving the input, the image analysis system retrieves a collection of images. The collection of images comprises images tagged with a label or tag. The image analysis system causes display of a presentation of the collection of images within the GUI. The presentation includes a display of each image among the collection. The user may then provide inputs to adjust various properties of the display, such as the size of the images.

FIG. 1 is a network diagram illustrating a network environment 100 suitable for operating an image analysis system 150. A networked system 102 provides server-side functionality, via a network 104 (e.g., an intranet, the Internet or a Wide Area Network (WAN)), to one or more clients such as client device 110, and data source 130. FIG. 1 illustrates a web client 112 and client applications 114 executing on the client device 110.

An Application Programming Interface (API) server 120 and a web server 122 are coupled to, and provide programmatic and web interfaces respectively to, one or more application servers 140. The application servers 140 host the image analysis system 150. The application servers 140 are, in turn, shown to be coupled to one or more database servers 124 that facilitate access to one or more databases 126.

The image analysis system 150 provides functionality to generate and cause display of presentations of collections of images within a specially configured GUI. The GUI includes functions to alter and adjust properties of the presentations of images.

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal distal assistant (PDA), a personal navigation device (PND), a handheld computer, a desktop computer, a laptop or netbook, or a wearable computing device), may be operated by a user (e.g., a person) of the networked system 100 to exchange data with the networked system 102 over the network 104.

The client device 110 communicates with the network 104 via a wired or wireless connection. For example, one or more portions of the network 104 may comprise an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more GUIs. The GUIs may be specifically associated with the web client 112 (e.g., a browser) or the client application 114, executing on the client device 110, and in communication with the networked system 102.

Figure 2:
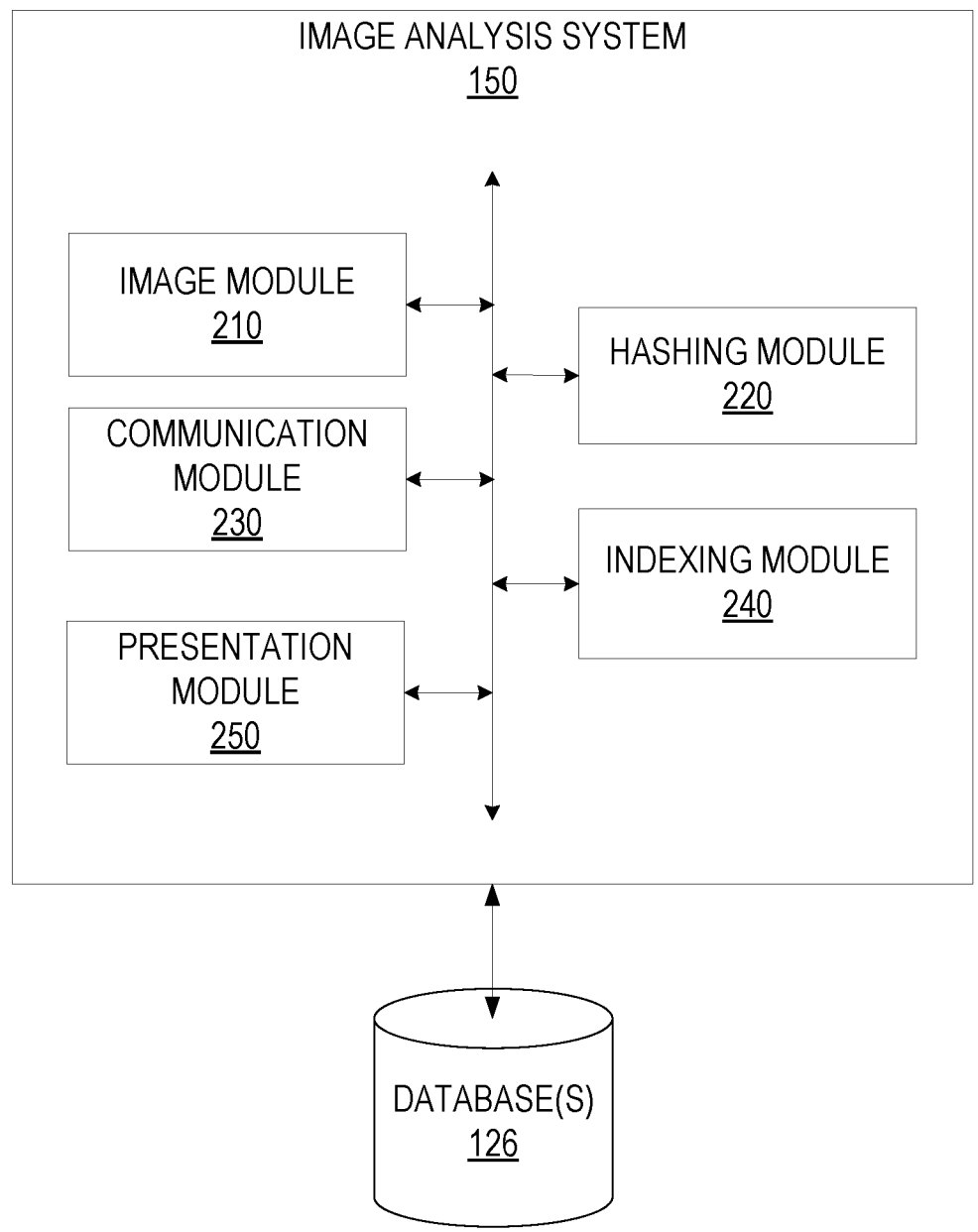
FIG. 2 is a block diagram illustrating various components of the image analysis system, which is provided as part of the networked system, consistent with some embodiments.

FIG. 2 is a block diagram illustrating an exemplary embodiment of the various components of the image analysis system 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the image analysis system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a singe computer (e.g., a laptop), or may be distributed across several computers in various arrangements such as cloud-based architectures. Moreover, any two or more modules of the image analysis system 150 may be combined into a singe module, or subdivided among multiple modules. It shall be appreciated that while the functional components (e.g., modules) of FIG. 2 are discussed in the singular sense, in other embodiments, multiple instances of one or more of the modules may be employed.

The image analysis system 150 is shown as including an image module 210, a hashing module 220, a communication module 230, an indexing module 240, and a presentation module 250, all configured to communicate with each other (e.g., via a bus, shared memory, a switch, or application programming interfaces (APIs)).

As seen in FIG. 2, the image analysis system 150 may be in communication with the databases 126 (e.g., via the database server 124). For example, the image analysis system 150 may store data necessary to perform the one or more actions of the image analysis system 150 within the databases 126. For example, the database 126 may comprise one or more lists of hash values, as well as a repository to index and store collections of images.

Figure 3:
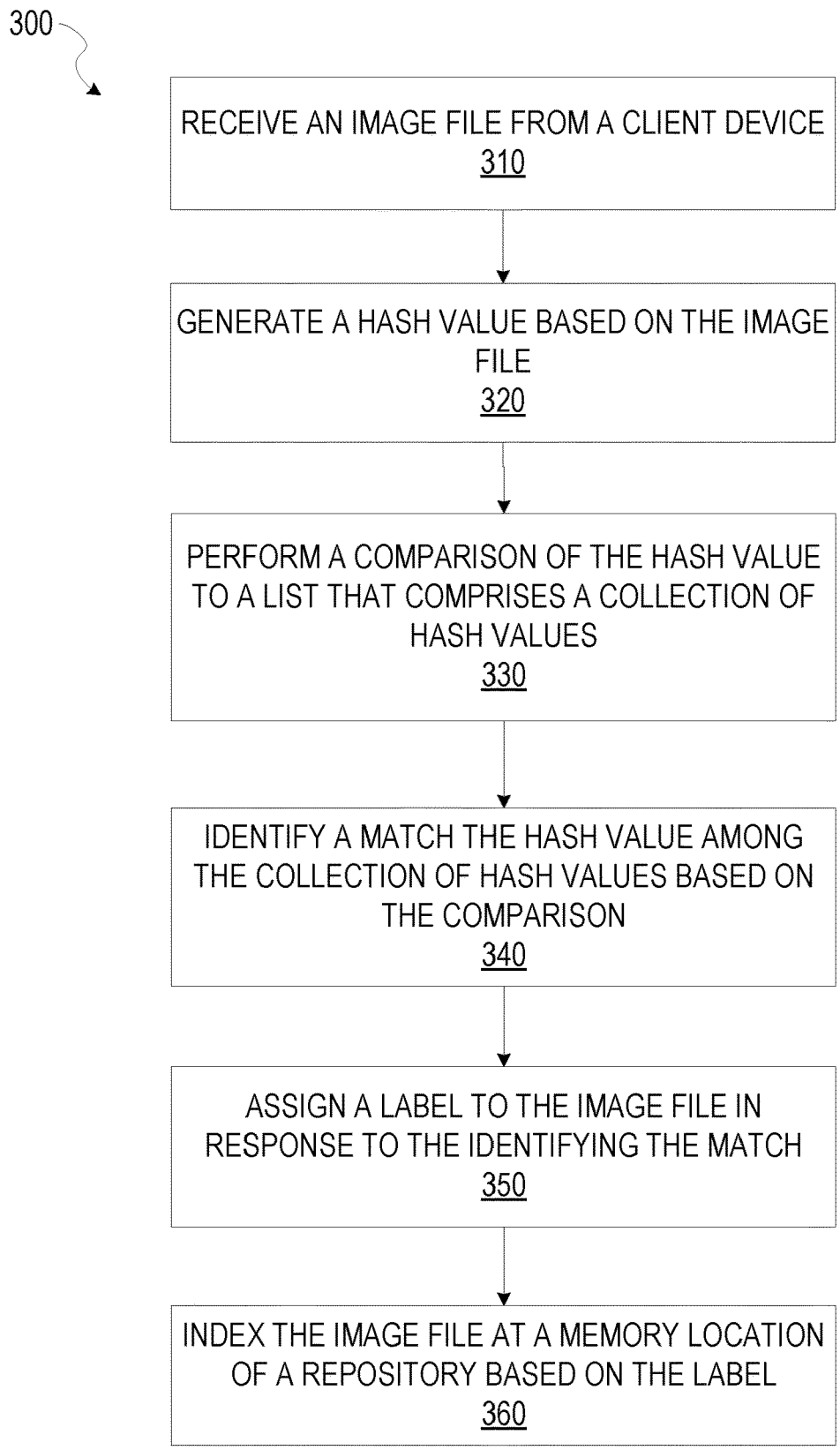
FIG. 3 is a flowchart illustrating a method for indexing an image file at a memory location, according to some example embodiments.

FIG. 3 is a flowchart illustrating a method 300 for indexing an image file at a memory location, according to some example embodiments. The method 300 is embodied in computer-readable instructions for execution by one or more processors such that the operations of the method 300 are performed in part or in whole by the functional components of the network-based image analysis system 150; accordingly, the method 300 is described below by way of example with reference thereto. However, it shall be appreciated that at least some of the operations of the method 300 may be deployed on various other hardware configurations, and the method 300 is not intended to be limited to the network-based image analysis system 150.

At operation 310, the image module 210 receives an image file from a client device (e.g., the client device 110). In some embodiments, the client device may provide the image file to the image module 210 in a data packet that comprises the image file along with corresponding annotation data. For example, the annotation data may include notes and additional information related to the image file.

At operation 320, the hashing module 220 generates a hash value based on the image file, in response to the image module 210 receiving the image file. The hashing module 220 may apply one or more hash functions to the image file in order to generate the hash value. For example, the hashing module 220 takes in an input value corresponding to the image file, and from that input creates an output value deterministic of the input value. Thus, by applying the same hash function to all image files received by the image module 210, duplicate input images receive the same output hash value whenever the hash function is run.

In some embodiments, the hashing module 220 applies an MD5 message-digest algorithm hash function to produce a 128-but hash value based on the image file received by the image module 210. For example, the hashing module 220 receives the image file from the image module 210, and breaks the image file up into chunks of 512-bit blocks. In some embodiments, the hashing module 220 may pad the image file so that its length is divisible by 512. In such embodiments, the hashing module 220 pads the image file by simply adding a single bit, 1, to the end of the image file, and adds as many zeros as are needed to bring the length of the image file up to 64 bits fewer than a multiple of 512. The remaining bits may be filled up with 64 bits representing the length of the original message.

At operation 330, the index module 240 performs a comparison of the hash value generated by the hashing module 220 with one or more lists of hash values. Each list is associated with a label or tag. The one or more lists of hash values may, for example, reside within the database 126.

At operation 340, the indexing module 240 identifies a match between the hash value generated by the hashing module 220 and a hash value from a list from the one or more lists. In some embodiments, the indexing module 240 may identify perfect or identical matches, as well as near or similar matches. For example, the indexing module 240 identifies hash values that are similar to the hash value generated by the hashing module 220 by identifying hash values that differ by a small integer value (e.g., 1 or 2).

At operation 350, in response to identifying the matching hash value from the list, the indexing module 240 assigns the label associated with the list to the hash value generated by the hashing module 220. The label may therefore indicate that the hash value represents a duplicate image, and may also provide an identification of the list associated with the matching hash value.

At operation 360, the indexing module 240 indexes the image file at a memory location within a repository based on the label assigned to the hash value. Thus, by referencing the label, the image analysis system 150 may identify, retrieve, and present the image file.

Figure 4:
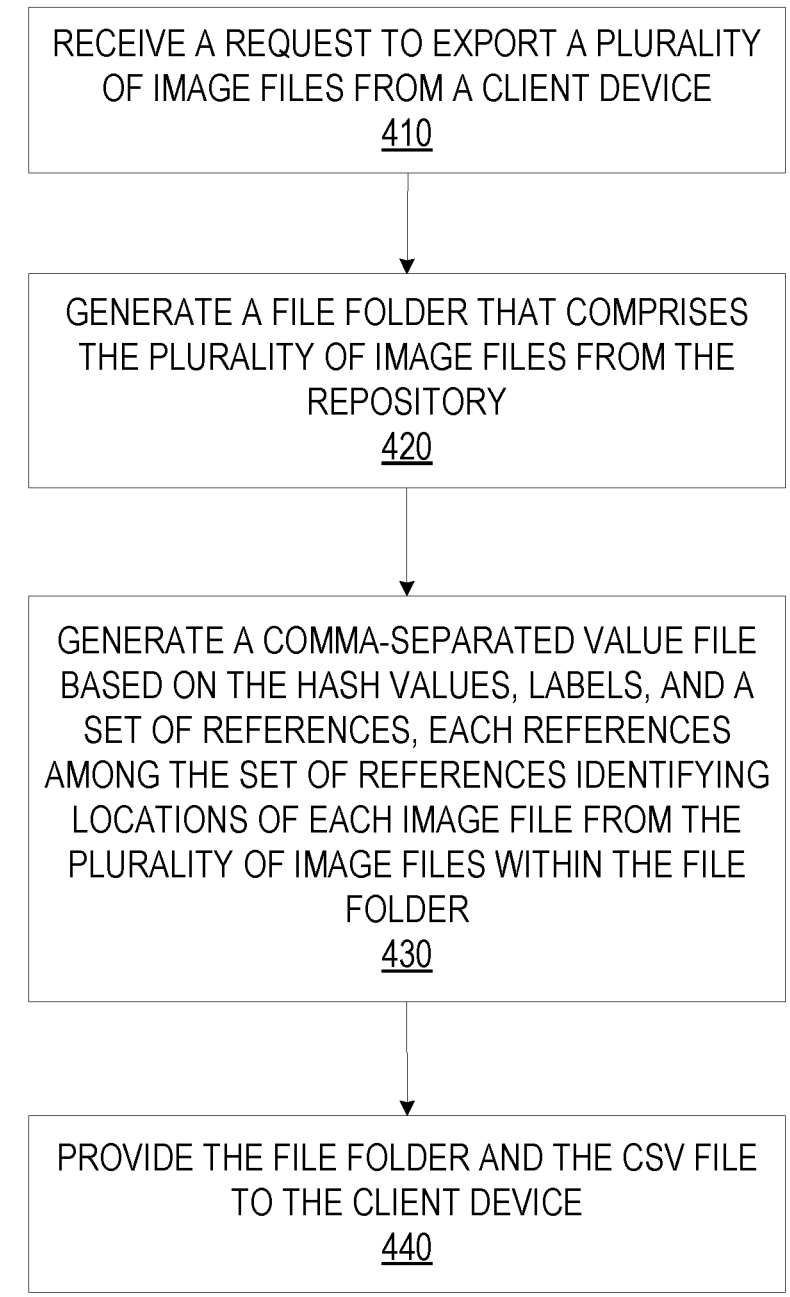
FIG. 4 is a flowchart illustrating a method for exporting a collection of image files, consistent with some embodiments.

FIG. 4 is a flowchart illustrating a method 400 for exporting a collection of image files, according to some example embodiments. The method 400 is embodied in computer-readable instructions for execution by one or more processors such that the operations of the method 400 are performed in part or in whole by the functional components of the image analysis system 150; accordingly, the method 400 is described below by way of example with reference thereto. However, it shall be appreciated that at least some of the operations of the method 400 may be deployed on various other hardware configurations, and the method 400 is not intended to be limited to the image analysis system 150. One or more operations of the method 400 may be performed as part (e.g., a precursor task, a subroutine, or a portion) of the method 300 of FIG. 3, according to some example embodiments.

The image analysis system 150 provides functionality to enable users to bulk export collections of images. For example, at operation 410, the communication module 230 receives a request to export a plurality of image files. For example, the request may include an identification of the plurality of image files, or an identification of a label or image attribute.

In response to the communication module 230 receiving the request to export the plurality of image files, the image module 210 generates a file folder that comprises the plurality of image files. For example, the image module 210 may identify the plurality of image files from a repository (e.g., the database 126), based on the request received by the communication module 230, and generate a compressed image file (i.e., a ZIP file) that comprises the plurality of image files.

In some embodiments, the image module 210 may assign a unique reference number to each of the image files within the file folder, such that the unique reference number identifies a location of the image file within the file folder.

At operation 430, the indexing module 240 generates a comma-separated value (CSV) file that comprises the hash values associated with each of the plurality of image files within the file folder, the labels or tagged associated with each of the plurality of image files within the file folder, as well as the unique reference numbers of each of the plurality of image files within the file folder.

At operation 440, the communication module 230 provides the file folder and the CSV file to the client device.

Figure 5:
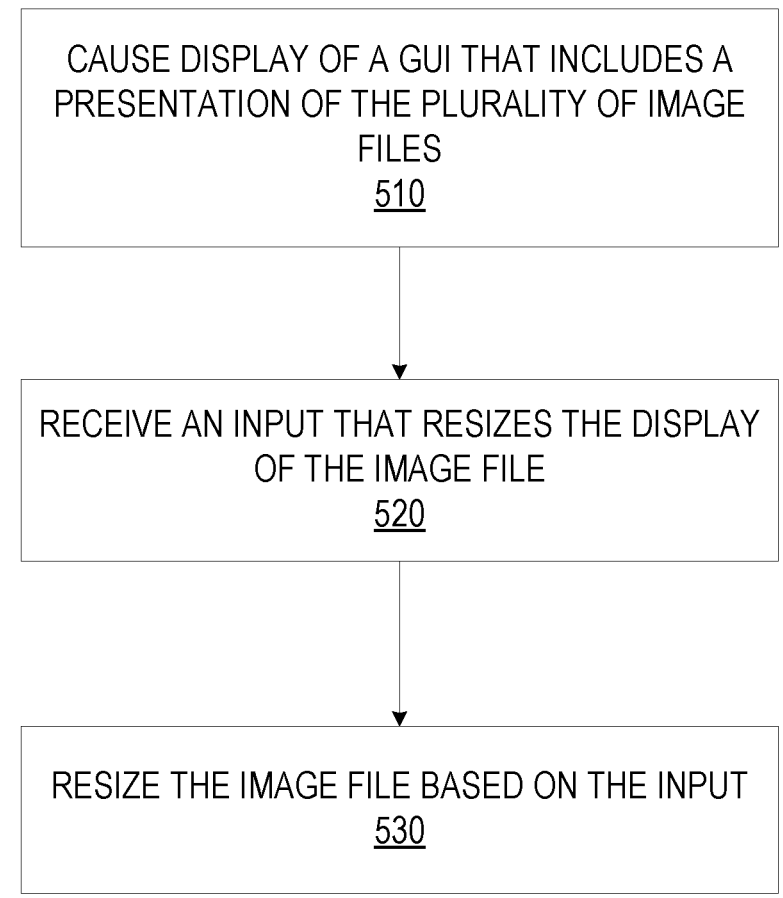
FIG. 5 is a flowchart illustrating a method for presenting a collection of image files, consistent with some embodiments.

FIG. 5 is a flowchart illustrating a method 500 for presenting a collection of image files, according to some example embodiments. One or more operations of the method 500 may be performed as part (e.g., a precursor task, a subroutine, or a portion) of operation the method 300 of FIG. 3, according to some example embodiments.

At operation 510, the presentation module 250 causes display of a GUI that includes a presentation of a plurality of image files. In some embodiments, a user 106 of the client device 110 may provide an input that identifies the plurality of image files based on an image attribute, or a label or tag associated with the images. For example, the user may provide an input to display all images within a list that contains duplicate images to an image recently uploaded by the user 106.

In response to the communication module 230 receiving the input identifying the plurality of image files, the presentation module 250 causes display of a presentation of the plurality of image files within a GUI at the client device 110.

In some embodiments, the presentation of the plurality of images comprises a display of each image from among the plurality of images. The display includes metadata associated with each of the images, as well as a display of various image attributes or annotations associated with the images. For example, the user 106 may provide an input that defines metadata or image attributes that should be included in the display.

At operation 520, the presentation module 250 receives an input via the client device 110. The input is indicative of a selection and resizing of a display of an image from among the presentation of the plurality of images. For example, the user 106 may select the image and change a size of the image by adjusting the size of the image in real-time.

At operation 530, the presentation module 250 resizes the display of the selected image based on the input received through the GUI, via the client device 110. An example of the GUI can be seen in the interface diagrams 800, 900, and 1000, depicted in FIGS. 8, 9, and 10.

Figure 6:
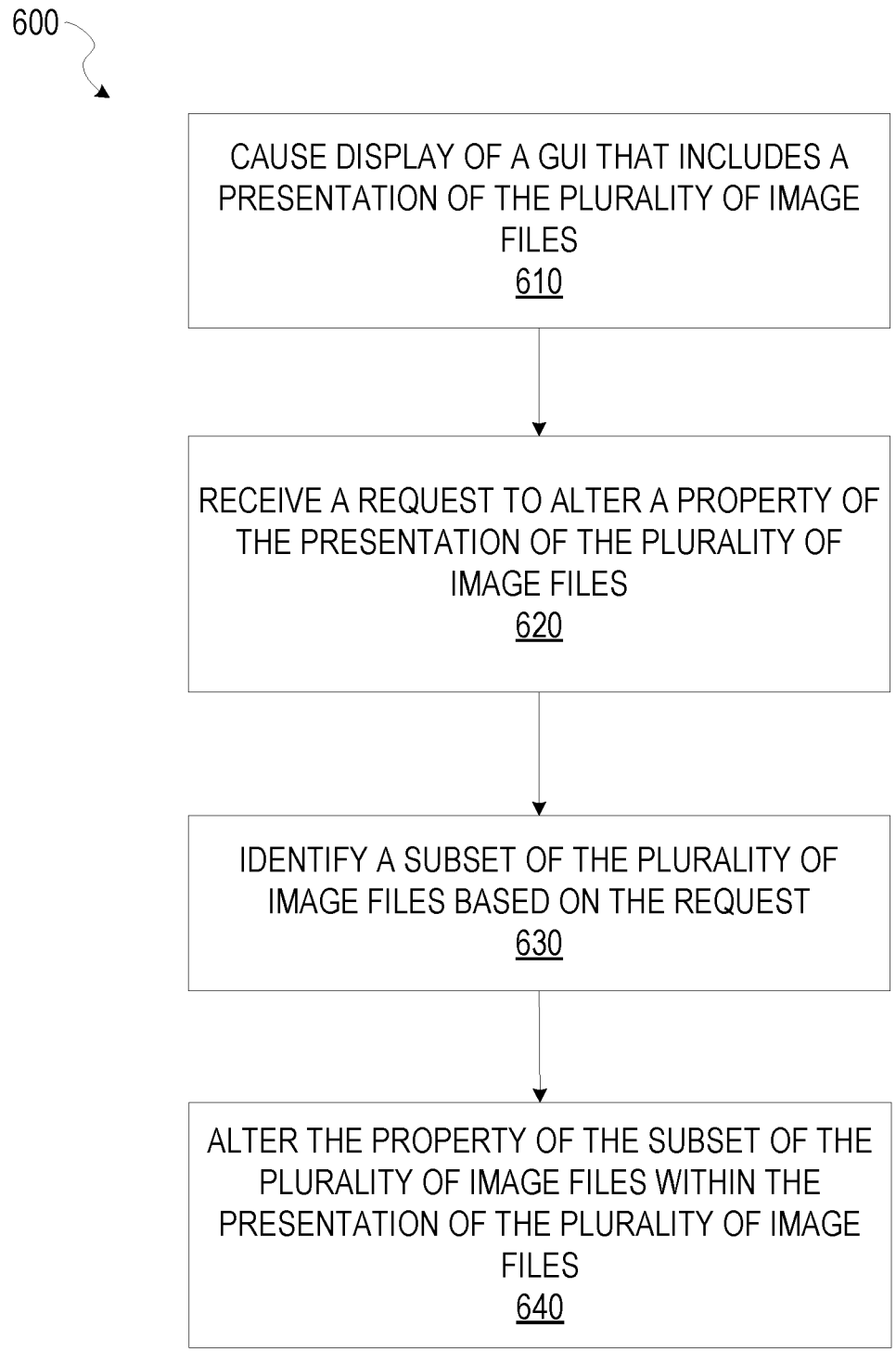
FIG. 6 is a flowchart illustrating a method for presenting a collection of image files, consistent with some embodiments.

FIG. 6 is a flowchart illustrating a method 600 for presenting a collection of image files, according to some example embodiments. One or more operations of the method 600 may be performed as part (e.g., a precursor task, a subroutine, or a portion) of the method 300 of FIG. 3, according to some example embodiments.

At operation 610, the presentation module 250 causes display of a GUI that includes a presentation of a plurality of image files. In some embodiments, a user 106 of the client device 110 may provide an input that identifies the plurality of image files based on an image attribute, or a label or tag associated with the images. For example, the user may provide an input indicative of a request to display all images within a list that contains duplicate images to an image recently uploaded by the user 106.

In response to the communication module 230 receiving the input identifying the plurality of image files, the presentation module 250 causes display of a presentation of the plurality of image files within a GUI at the client device 110.

At operation 620, the user 106 of the client device 110 provides a request to alter one or more properties of the presentation of the plurality of image files. The request includes an identification of a subset of the plurality of image files depicted in the presentation. For example, the request may include an identification of a label, or an image attribute. Image attributes may include metadata that identifies a location associated with the image, as well as temporal data from the metadata that identifies a time and date in which the image was captured.

At operation 630, the image module 210 identifies a subset of the plurality of image files depicted in the presentation based on the request.

At operation 640, the presentation module 250 alters the property of the subset of the plurality of images depicted in the presentation based on the request. The property may include a size of the images displayed in the presentation, or a colorization. For example, based on the request, the presentation module 250 may display the subset of the plurality of images in black and white.

Figure 7:
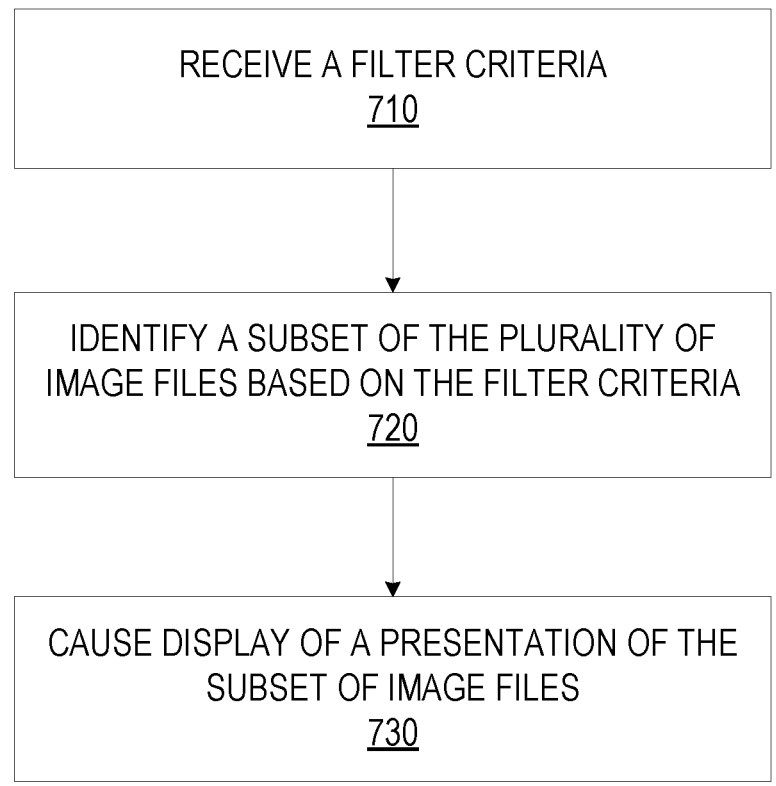
FIG. 7 is a flowchart illustrating a method for presenting a collection of image files, consistent with some embodiments.

FIG. 7 is a flowchart illustrating a method 700 for presenting a collection of image files, according to some example embodiments. One or more operations of the method 700 may be performed as part (e.g., a precursor task, a subroutine, or a portion) of the method 300 of FIG. 3, according to some example embodiments.

At operation 710, the communication module 230 receives input indicative of one or more filter criteria from the client device 110. For example, the filter criteria may include an identification of a label or tag as well as an identification of an image attribute, such as the presence of certain metadata in an image file.

At operation 720, the indexing module 240 identifies a subset of a plurality of image files based on the one or more filter criteria. For example, the indexing module 240 may access the database 126 and identify the subset of image files by referencing the label or tag provided by the request.

Figure 8:
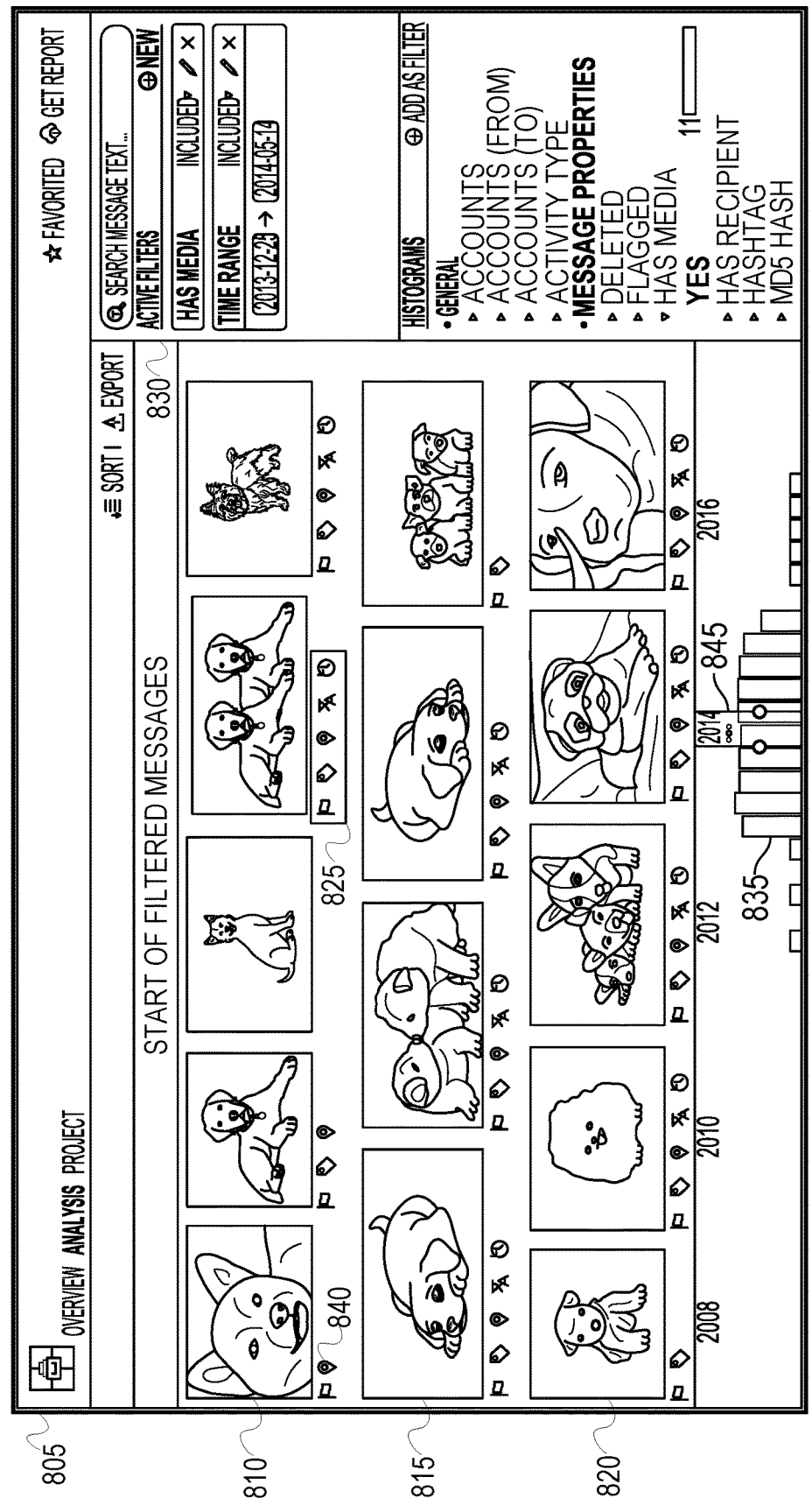
FIG. 8 is an interface diagram depicting a graphical user interface to present a collection of image files, consistent with some embodiments.
Figure 9:
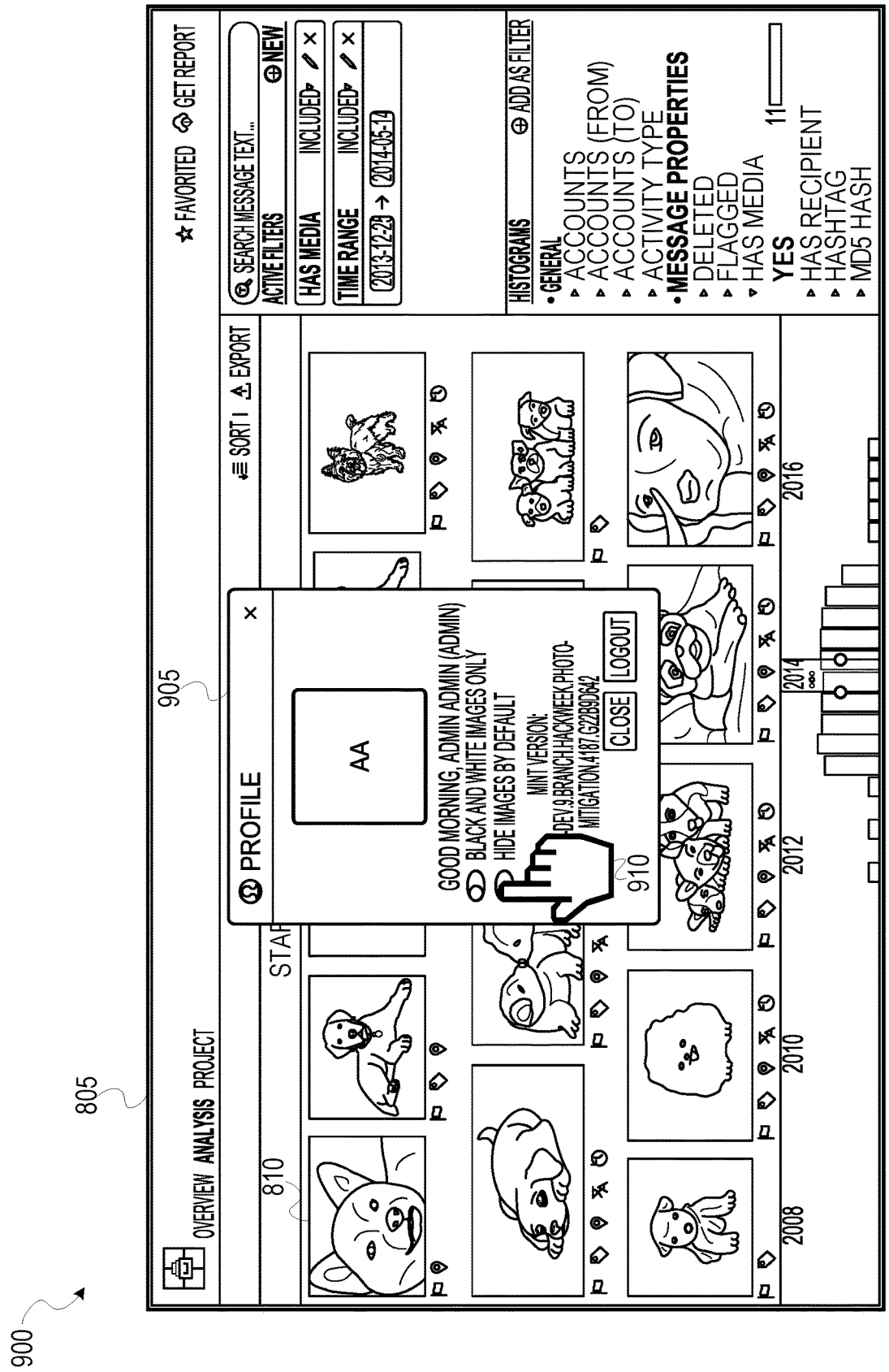
FIG. 9 is an interface diagram depicting a graphical user interface to present a collection of image files, consistent with some embodiments.
Figure 10:
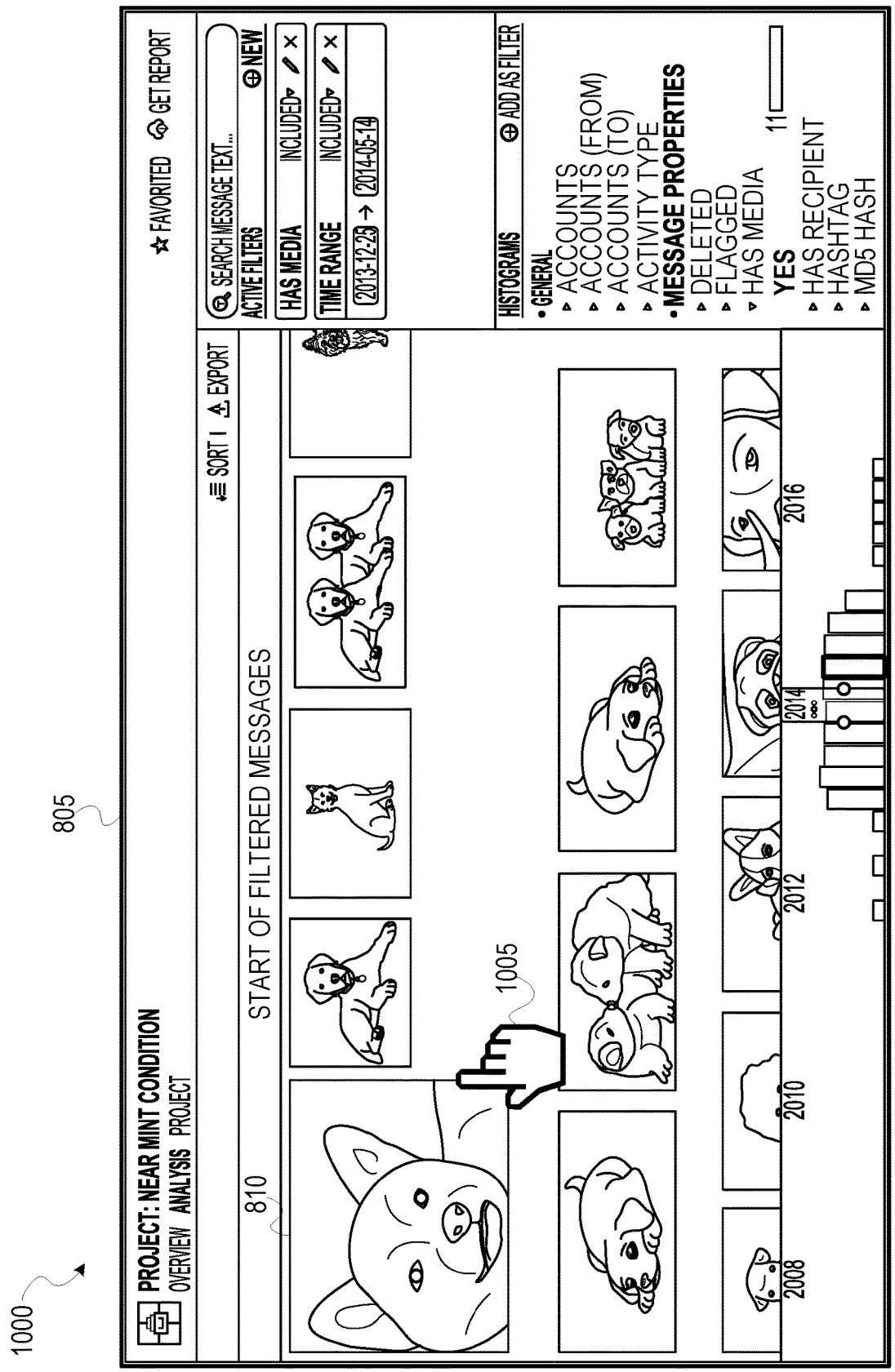
FIG. 10 is an interface diagram depicting a graphical user interface to present a collection of image files, consistent with some embodiments.

At operation 730, the presentation module 250 causes display of a presentation of the identified subset of image files within a specially configured GUI, such as the GUI 805, 905, or 1005, depicted in FIGS. 8, 9, and 10.

FIG. 8 is an interface diagram 800 depicting the GUI 805 to display a collection of image files for analysis, according to certain example embodiments, and as discussed in the methods 300, 400, 500, 600, and 700. As seen in the interface diagram 800, the GUI 805 comprises a presentation of a collection of images, such as images 810, 815, and 820.

For example, as discussed in the method 700 depicted in FIG. 7, a user of a client device 110 may provide inputs that defines filter criteria. In response to receiving the filter criteria, the image analysis system 150 retrieves and causes display of a presentation of a collection of images, wherein the presentation of each image among the collection of images includes a display of image metadata identifiers, such as metadata identifiers 825, indicating the available image metadata (e.g., device identifier, location data, temporal data) of each corresponding image. Each metadata identifier corresponds to a distinct metadata type, such that presence of a metadata identifier, such as the metadata identifier 840, indicates the availability of the corresponding metadata for a particular image, such as image 810.

For example, in response to determining that image 810 includes location data that identifies one or more locations associated with the image 810, the image analysis system 150 causes display of the metadata identifier 840 at a position proximate to the image 810 to indicate the presence of the location data. Similarly, in response to determining that the metadata of the image includes a device identifier or temporal data that identifies a time or data associated with the image, the image analysis system 150 may cause display of corresponding metadata identifiers at locations proximate to their corresponding images within the GUI 805.

As seen in the interface diagram 800, the GUI 805 may include a display of a filter interface 830. A user 106 may provide various inputs as discussed in the method 700 depicted in FIG. 7 to select filter criteria from the filter interface 830. In some embodiments, the image analysis system 150 may cause display of a histogram 835 to depict a distribution of data associated with the images among the collection depicted within the GUI 805, and configured to receive a filter criteria. For example, as seen in the interface diagram 800, the histogram 835 depicts a distribution of images according to corresponding temporal data of the images. A user 106 may provide an input defining a filter criteria by moving components of the filter element 845 to locations along the histogram 835 to define a minimum and maximum value.

FIG. 9 is an interface diagram 900 depicting the GUI 805 to present a collection of image files for analysis, according to certain example embodiments, and as discussed in the methods 300, 400, 500, 600, and 700. As seen in the interface diagram 900, the image analysis system 150 may present the dialogue box 905 within the GUI 805.

A user 106 may provide an input via the cursor 910 that selects one or more options presented within the dialogue box 905, and in response, the image analysis system 150 may alter an image property of one or more images from among the presentation of the collection of images depicted in the GUI 805. In some embodiments, responsive to receiving the input via the cursor 910, the image analysis system 150 may change image properties of a single image depicted in the GUI 805, such as a color property. For example, the input via the cursor 910 into the dialogue box 910 may cause one or more of the images that include an identified property to be displayed in black and white. For example, the input into the dialogue box 905 may indicate that all images that include image metadata identifying a specific location are to be displayed in black and white. Responsive to a determination that image 810 includes image metadata identifying the location, the image analysis system 150 updates the display such that image 810 is displayed in black and white.

FIG. 10 is an interface diagram 1000 illustrating the GUI 805 to present a collection of image files for analysis, according to certain example embodiments, and as discussed in the methods 300, 400, 500, 600, and 700. As seen in FIG. 10, a user 106 may provide the input via the cursor 1005 directly into the GUI 805 to resize one or more images (e.g., the image 810) from among the collection of images depicted in the GUI 805. The image analysis system 150 may thereby resize the selected image (e.g., image 810) based on the input received via the cursor 1005.

Figure 11:
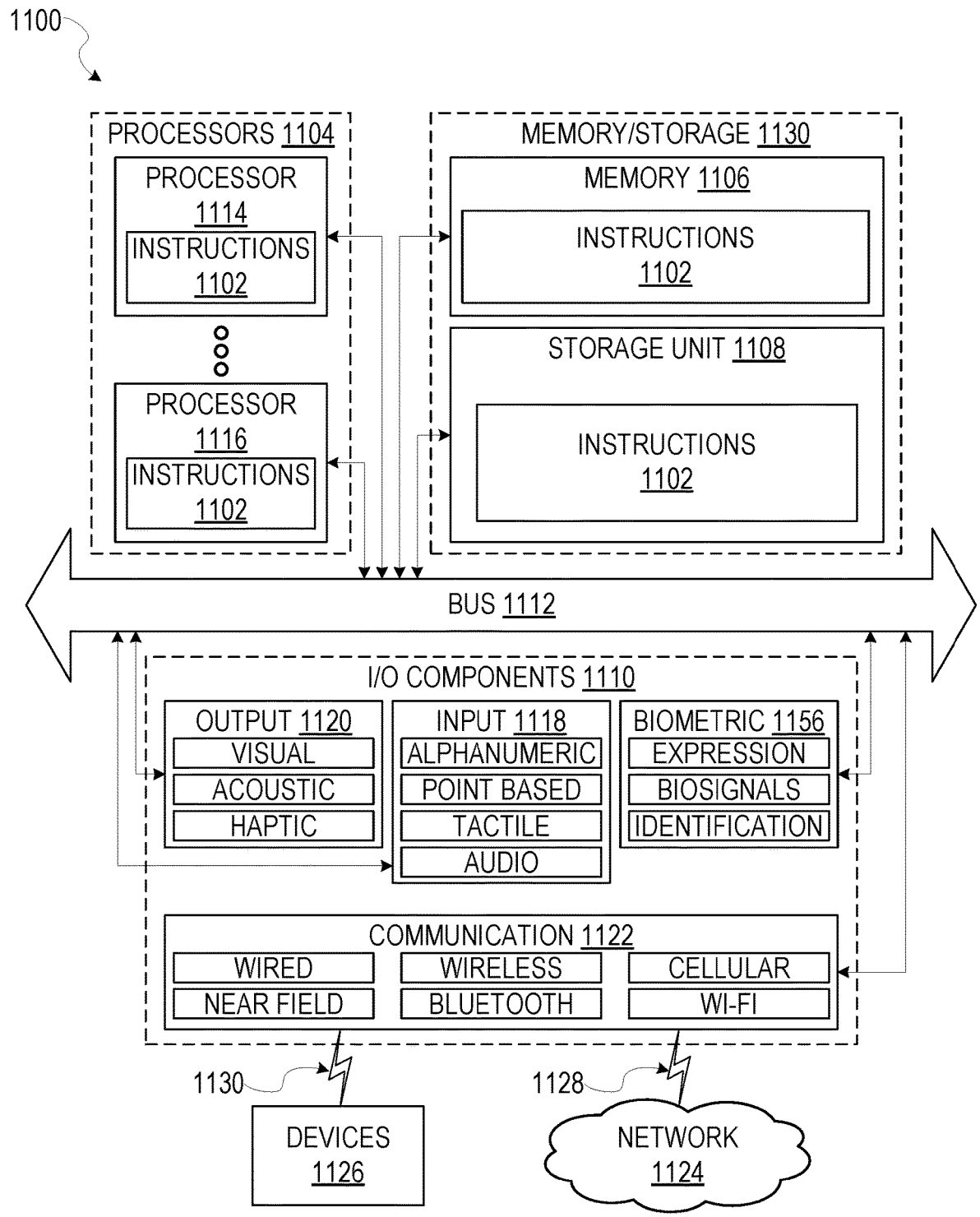
FIG. 11 is a diagrammatic representation of a machine in the example form of a computer system within which a set of instructions for causing the machine to perform any one or more of the methodologies discussed herein may be executed.

FIG. 11 is a diagrammatic representation of a machine 1100 in the example form of a computer system within which a set of instructions for causing the machine to perform any one or more of the methodologies discussed herein may be executed. Specifically, FIG. 11 shows a diagrammatic representation of the machine 1100 in the example form of a system, within which instructions 1102 (e.g., software, a program, an application, an applet, an app, a driver, or other executable code) for causing the machine 1100 to perform any one or more of the methodologies discussed herein may be executed. For example, the instructions 1102 include executable code that causes the machine 1100 to execute the methods 300, 400, 500, 600 and 700. In this way, these instructions 1102 transform the general, non-programmed machine into a particular machine programmed to carry out the described and illustrated functions in the manner described herein. The machine 1100 may operate as a standalone device or may be coupled (e.g., networked) to other machines.

By way of non-limiting example, the machine 1100 may comprise or correspond to a television, a computer (e.g., a server computer, a client computer, a personal computer (PC), a tablet computer, a laptop computer, or a netbook), a set-top box (STB), a personal distal assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1102, sequentially or otherwise, that specify actions to be taken by machine 1100. Further, while only a singe machine 1100 is illustrated, the term "machine" shall also be taken to include a collection of machines 1100 that individually or jointly execute the instructions 1102 to perform any one or more of the methodologies discussed herein.

The machine 1100 may include processors 1104, memory 1106, storage unit 1108 and I/O components 1110, which may be configured to communicate with each other such as via a bus 1112. In an example embodiment, the processors 1104 (e.g., a central processing unit (CPU), a reduced instruction set computing (RISC) processor, a complex instruction set computing (CISC) processor, a graphics processing unit (GPU), a distal signal processor (DSP), an application specific integrated circuit (ASIC), a radio-frequency integrated circuit (RFIC), another processor, or any suitable combination thereof) may include, for example, processor 1114 and processor 1116 that may execute instructions 1102. The term "processor" is intended to include multi-core processors that may comprise two or more independent processors (sometimes referred to as "cores") that may execute instructions contemporaneously. Although FIG. 11 shows multiple processors, the machine 1100 may include a singe processor with a singe core, a singe processor with multiple cores (e.g., a multi-core processor), multiple processors with a singe core, multiple processors with multiples cores, or any combination thereof.

The memory 1106 (e.g., a main memory or other memory storage) and the storage unit 1108 are both accessible to the processors 1104 such as via the bus 1112. The memory 1106 and the storage unit 1108 store the instructions 1102 embodying any one or more of the methodologies or functions described herein. In some embodiments, the databases 126 resides on the storage unit 1108. The instructions 1102 may also reside, completely or partially, within the memory 1106, within the storage unit 1108, within at least one of the processors 1104 (e.g., within the processor's cache memory), or any suitable combination thereof, during execution thereof by the machine 1100. Accordingly, the memory 1106, the storage unit 1108, and the memory of processors 1104 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a singe medium or multiple media (e.g., a centralized or distributed database, or associated caches and servers) able to store instructions 1102. The term "machine-readable medium" shall also be taken to include any medium, or combination of multiple media, that is capable of storing instructions (e.g., instructions 1102) for execution by a machine (e.g., machine 1100), such that the instructions, when executed by one or more processors of the machine 1100 (e.g., processors 1104), cause the machine 1100 to perform any one or more of the methodologies described herein (e.g., methods 400 and 500). Accordingly, a "machine-readable medium" refers to a singe storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1110 may include a wide variety of components to receive input, provide output, produce output, transmit information, exchange information, capture measurements, and so on. The specific I/O components 1110 that are included in a particular machine will depend on the type of machine. For example, portable machines such as mobile phones will likely include a touch input device or other such input mechanisms, while a headless server machine will likely not include such a touch input device. It will be appreciated that the I/O components 1110 may include many other components that are not specifically shown in FIG. 11. The I/O components 1110 are grouped according to functionality merely for simplifying the following discussion and the grouping is in no way limiting In various example embodiments, the I/O components 1110 may include input components 1118, biometric components 1156, and output components 1120. The input components 1118 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1120 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The biometric components 1156 may include, but are not limited to fingerprint, palm veins, face recognition, DNA, palm print, hand geometry, iris recognition, retina and odour/scent. Behavioral characteristics are related to the pattern of behavior of a person, including but not limited to typing rhythm, gait, and voice.

Communication may be implemented using a wide variety of technologies. The I/O components 1110 may include communication components 1122 operable to couple the machine 1100 to a network 1124 or devices 1126 via coupling 1128 and coupling 1130, respectively. For example, the communication components 1122 may include a network interface component or other suitable device to interface with the network 1124. In further examples, communication components 1122 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1126 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a singe machine, but deployed across a number of machines. In some example embodiments, the processor or processors may be located in a singe location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in distal electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors of a machine; and
a memory storing instructions that, when executed by the one or more processors, cause the machine to perform operations comprising:
receiving an image file at the system;
generating a hash value based on the image file;

performing a comparison of the hash value with a list of hash values, the list of hash values comprising a label;

identifying a match to the hash value from among the list of hash values based on the comparison;

assigning the label associated with the list of hash values to the image file in response to the identifying the match to the hash value from among the list of hash values;

indexing the image file at a memory location of a repository, the memory location being identified by the label;

receiving, from a client device, a request that includes an identification of the label and an image attribute that includes a device identifier associated with a device that captured an image;

accessing the memory location of the repository based on the identification of the label from the request;

causing display of a presentation of the image file among a collection of images at the client device, the presentation of the image file comprising a display of the image attribute identified in the request;

receiving, from the client device, a request to export the collection of images that include the image file; and generating a file that comprises a set of hash values associated with each image among the collection of images based on the request to export the collection of images.

2. The system of claim 1, wherein:

the repository comprises a plurality of image files, each image file of the plurality of image files including corresponding hash values and labels, and the operations further comprise:

generating a file folder that comprises the plurality of image files from the repository; and generating a file based on the hash values, labels, and a set of references, each reference in the set of references identifying locations of each image file from the plurality of image files within the file folder.

3. The system of claim 1, wherein:

the repository comprises a plurality of image files that include the image file, and the operations further comprise:

receiving an input indicative of a request to resize the image file; and resizing the image file based on the input.

4. The system of claim 3, wherein:

the operation further comprise:

extracting metadata from the image file in response to the receiving the image file, the metadata including geo-location coordinates; and the presentation of the plurality of image files comprises a visual display of at least the image file, the visual display comprising an indication of a location based on the geo-location coordinates.

5. The system of claim 1, wherein:

the repository comprises a plurality of image files that include the image file, and the operations further comprise:

causing display of a graphical user interface that includes the presentation of the image file among a plurality of image files;

receiving a request to alter a property of the presentation of the plurality of image files that include the image file, the request including an identification of the label;

identifying a subset of the plurality of image files based on the label, the subset including at least the image file; and altering the property of the subset of the plurality of image files within the presentation of the plurality of image files.

6. The system of claim 5, wherein the property includes a colorization of the image file.

7. The system of claim 1, wherein:

the repository comprises a plurality of image files that include the image file, and the operations further comprise:

receiving one or more filter criteria that includes an identification of the label;

identifying a subset of the plurality of image files based on the label, the subset including at least the image file; and causing display of the presentation of the image file among the subset of the plurality of image files.

8. The system of claim 1, wherein:

the list is a first list from among a plurality of lists, the label is a first label, the match is a first match, the performing the comparison of the hash value with the list includes performing the comparison of the hash value with a plurality of hash values from the plurality of lists, and the operations further comprise:

identifying a second match to the hash value from a second list;

assigning a second label to the image file; and indexing the image file at the memory location of the repository, the memory location of the repository being identified by the first label and the second label.

9. The system of claim 1, wherein:

the generating the hash value based on the image file includes generating the hash value based on the image file at the client device; and the receiving the image file from the client device includes receiving the image file and the hash value from the client device.

10. The system of claim 1, wherein the operations further comprise:

adding the hash value to the collection of hash values.

11. A method comprising:

receiving an image file at the system;

generating a hash value based on the image file;

performing a comparison of the hash value with a list of hash values, the list of hash values comprising a label;

identifying a match to the hash value from among the list of hash values based on the comparison;

assigning the label associated with the list of hash values to the image file in response to the identifying the match to the hash value from among the list of hash values;

indexing the image file at a memory location of a repository, the memory location being identified by the label;

receiving, from a client device, a request that includes an identification of the label and an image attribute that includes a device identifier associated with a device that captured an image;

accessing the memory location of the repository based on the identification of the label from the request;

causing display of a presentation of the image file among a collection of images at the client device, the presentation of the image file comprising a display of the image attribute identified in the request;

receiving, from the client device, a request to export the collection of images that include the image file; and generating a file that comprises a set of hash values associated with each image among the collection of images based on the request to export the collection of images.

12. The method of claim 11, wherein the repository comprises a plurality of image files, each image file among the plurality of image files including corresponding hash values and labels, and the method further comprise:
generating a file folder that comprises the plurality of image files from the repository; and
generating a comma-separated value (CSV) file based on the hash values, labels, and a set of references, each reference among the set of references identifying locations of each image file from the plurality of image files within the file folder.

13. The method of claim 11, wherein the repository comprises a plurality of image files that include the image file, and the operations further comprise:
receiving an input that resizes the presentation of the image file; and
resizing the presentation of the image file based on the input.

14. The method of claim 13, wherein the method further comprises:
extracting metadata from the image file in response to the receiving the image file, the metadata including geo-location coordinates; and
wherein the presentation of the plurality of image files comprises a visual display of at least the image file that comprises an indication of a location based on the geo-location coordinates.

15. The method of claim 11, wherein the repository comprises a plurality of image files that include the image file, and the method further comprises:
causing display of a graphical user interface that includes the presentation of the image file among a plurality of image files;
receiving a request to alter a property of the presentation of the plurality of image files that include the image file, the request including an identification of the label;
identifying a subset of the plurality of image files based on the label, the subset including at least the image file; and
altering the property of the subset of the plurality of image files within the presentation of the plurality of image files.

16. The method of claim 15, wherein the property includes a colorization of the image file.

17. The method of claim 11, wherein the repository comprises a plurality of image files that include the image file, and the operations further comprise:
receiving one or more filter criteria that includes an identification of the label;
identifying a subset of the plurality of image files based on the label, the subset including at least the image file; and
causing display of the presentation of the image file among the subset of the plurality of image files.

18. The method of claim 11, wherein the list if a first list from among a plurality of lists, the label is a first label, the match is a first match, wherein the performing the comparison of the hash value with the list includes performing the comparison of the hash value with a plurality of hash values from the plurality of lists, and wherein the operations further comprise:
identifying a second match to the hash value from a second list;
assigning a second label to the image file; and
indexing the image file at the memory location of the repository, wherein the memory location of the repository is identified by the first label and the second label.

19. A non-transitory machine-readable medium comprising instructions that, when executed by one or more processors of a machine, cause the machine to perform operations comprising:
receiving an image file at the system;
generating a hash value based on the image file;
performing a comparison of the hash value with a list of hash values, the list of hash values comprising a label;
identifying a match to the hash value from among the list of hash values based on the comparison;
assigning the label associated with the list of hash values to the image file in response to the identifying the match to the hash value from among the list of hash values;
indexing the image file at a memory location of a repository, the memory location being identified by the label;
receiving, from a client device, a request that includes an identification of the label and an image attribute that includes a device identifier associated with a device that captured an image;
accessing the memory location of the repository based on the identification of the label from the request;
causing display of a presentation of the image file among a collection of images at the client device, the presentation of the image file comprising a display of the image attribute identified in the request;
receiving, from the client device, a request to export the collection of images that include the image file; and
generating a file that comprises a set of hash values associated with each image among the collection of images based on the request to export the collection of images.

20. The non-transitory machine-readable storage medium of claim 19, wherein the repository comprises a plurality of image files, each image file among the plurality of image files including corresponding hash values and labels, and the instructions cause the machine to perform operations further comprising:
generating a file folder that comprises the plurality of image files from the repository; and
generating a comma-separated value (CSV) file based on the hash values, labels, and a set of references, each reference among the set of references identifying locations of each image file from the plurality of image files within the file folder.

* * * * *